(12) United States Patent
Kakita et al.

(10) Patent No.: US 9,688,222 B2
(45) Date of Patent: Jun. 27, 2017

(54) STEERING APPARATUS

(71) Applicant: NSK Ltd., Shinagawa-ku, Tokyo (JP)

(72) Inventors: Hiroshi Kakita, Gunma (JP); Daiki Orihara, Gunma (JP); Osamu Kurihara, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/120,121

(22) PCT Filed: May 28, 2015

(86) PCT No.: PCT/JP2015/065370
§ 371 (c)(1),
(2) Date: Aug. 18, 2016

(87) PCT Pub. No.: WO2015/190301
PCT Pub. Date: Dec. 17, 2015

(65) Prior Publication Data
US 2017/0057433 A1     Mar. 2, 2017

(30) Foreign Application Priority Data

Jun. 13, 2014   (JP) ................................ 2014-122605
Sep. 11, 2014   (JP) ................................ 2014-185020

(51) Int. Cl.
| | |
|---|---|
| *B60R 16/027* | (2006.01) |
| *B62D 1/185* | (2006.01) |
| *B60R 16/023* | (2006.01) |
| *B62D 1/19* | (2006.01) |
| *B62D 1/189* | (2006.01) |

(52) U.S. Cl.
CPC ........ *B60R 16/027* (2013.01); *B60R 16/0231* (2013.01); *B62D 1/185* (2013.01); *B62D 1/192* (2013.01); *B62D 1/189* (2013.01); *H01R 2201/26* (2013.01)

(58) Field of Classification Search
CPC ... B60R 16/027; B60R 16/0231; B62D 1/192; B62D 1/19; B62D 1/185; B62D 1/189; H01R 2201/26
USPC .......................................................... 74/493
See application file for complete search history.

(56) References Cited

FOREIGN PATENT DOCUMENTS

| JP | 2005-75250 A | 3/2005 |
|---|---|---|
| JP | 2005-280498 A | 10/2005 |

(Continued)

OTHER PUBLICATIONS

International Preliminary Report on Patentability for International Patent Application No. PCT/JP2015/065370, May 31, 2016.

(Continued)

*Primary Examiner* — Karen Beck
(74) *Attorney, Agent, or Firm* — Shapiro, Gabor and Rosenberger, PLLC

(57) ABSTRACT

A steering apparatus has a guide member (31) being received in a guide groove (25) and attached to an inner column (11), metal fittings that have conductivity, is in contact with the inner column to attach the guide member to the inner column, and an electricity-carrying plate (40) that is composed of a metal plate material having conductivity, is fixed to the inner column in contact with the metal fittings, and elastically deforms and in contact with an inside of a pair of guide walls at a predetermined contact pressure, so that a new electricity-carrying passage from a steering wheel to a vehicle body is secured.

7 Claims, 10 Drawing Sheets

(56) References Cited

FOREIGN PATENT DOCUMENTS

JP        2009-107506  A    5/2009
WO    WO 2004/000627  A1   12/2003

OTHER PUBLICATIONS

International Search Report for International Patent Application No. PCT/JP2015/065370, Jul. 7, 2015.

STEERING APPARATUS

TECHNICAL FIELD

The present invention relates to a steering apparatus to be mounted in an automobile or the like, and more specifically, to a technology on securing an electricity-carrying passage of electrical components to be installed to a steering wheel.

BACKGROUND ART

In automobiles in recent years, in order to relieve an impact load received by a driver, which results from secondary collision between the driver and a steering wheel upon an accident, a steering apparatus in which secondary collision energy is absorbed by contraction of a steering column formed of two components: an inner column and an outer column has been widely adopted. In this kind of steering apparatus, the steering wheel moves toward a front side with respect to a vehicle by relative sliding of the inner column and the outer column in an axial direction, and the secondary collision energy is absorbed by an energy absorption means provided between the inner column and the outer column.

For example, in a steering apparatus described in PTL 1, an outer column arranged on a lower side is attached to a vehicle body through a tilt bracket and a tilt pivot, and an inner column arranged on an upper side is held on the outer column by being fastened with a tilt/telescopic adjustment mechanism. In this steering apparatus, an amount in which the inner column can enter into the outer column upon the secondary collision is set to be larger than the amount upon telescopic adjustment, and the inner column moves toward the front side with respect to the vehicle against friction force generated by fastening with the tilt/telescopic adjustment mechanism.

In such a steering apparatus, it is required to smoothly absorb the secondary collision energy when a light-weight driver collides with the steering wheel. In order to achieve such a requirement, it is considered to reduce the fastening force with the tilt/telescopic adjustment mechanism. However, when the fastening force is reduced, a force holding the inner column is reduced, so that backlash is easily caused in a fitting portion between the inner column and the outer column. Therefore, in PTL 1, low-friction material treatment by coating or the like is applied to an outer peripheral surface of the inner column, or an inner peripheral surface of the outer column to reduce the friction force generated by fastening without reducing the fastening force.

Moreover, in a telescopic type steering apparatus, a steering shaft is generally constructed by an inner shaft and an outer shaft spline-connected to each other in the steering column in order to satisfy both transmission of steering torque and telescopic adjustment. In this case, in order to prevent backlash noise caused by a fine clearance between a male spline and a female spline, resin coating is applied to one of both of the splines in several cases.

CITATION LIST

Patent Literature

PTL 1: WO 2004/000627 A

SUMMARY OF INVENTION

Technical Problem to be Solved by the Invention

To a steering wheel of an automobile, electrical components such as a horn and an air bag are attached, and many of these electrical components are earthed to a vehicle body. Thus, it is necessary to secure an electricity-carrying passage from the steering wheel to the vehicle body.

However, if low-friction material coating is applied to an inner peripheral surface of an outer column, or an outer peripheral surface of an inner column as mentioned above, electricity carriage by the electricity-carrying passage through a contact surface between the inner column and the outer column becomes difficult by the coating. Moreover, if resin coating is applied to a spline-fitting portion of a steering shaft, the electricity carriage by the electricity-carrying passage through the spline-fitting portion becomes difficult by the resin coating.

An object of the present invention is to provide a steering apparatus in which a new electricity-carrying passage from the steering wheel to the vehicle body is secured.

Solution to the Problem

In order to solve the above-described problem, the present invention provides a steering apparatus, comprising:

a steering shaft having conductivity and transmitting steering force;

an outer column having conductivity and rotatably supporting the steering shaft, the outer column being provided with a guide groove formed therethrough in a radial direction and extending in an axial direction and a pair of guide walls projecting outward in the radial direction and extending along the guide groove on both sides of the guide groove;

an inner column having conductivity, the inner column being fitted in the outer column to enable relative movement to each other in the axial direction, and rotatably supporting the steering shaft;

a guide member being received in the guide groove and attached to the inner column; and an electricity-carrying plate having conductivity, being fixed to the inner column, and elastically deformed and in contact with insides of the pair of guide walls at a predetermined contact pressure.

Thus, a new electricity-carrying passage from a steering wheel to a vehicle body can be secured.

The steering apparatus preferably has a metal fitting having conductivity and fixing the electricity-carrying plate and the guide member to the inner column. Thus, the electricity-carrying plate and the guide member can be easily attached thereto.

The electricity-carrying plate preferably has a pair of contact pieces in contact with the insides of the pair of guide walls. Thus, an electricity-carrying member is further stably brought into contact with the outer column.

Moreover, the pair of contact pieces are preferably arranged on a more front side with respect to the vehicle than the guide member. Thus, a limit of telescopic adjustment on a rear side becomes able to be easily defined.

The pair of contact pieces are preferably arranged on a more rear side with respect to the vehicle than the guide member. Thus, a movement distance of the inner column for impact absorption upon secondary collision is easily lengthened toward the front side with respect to the vehicle.

Moreover, the electricity-carrying plate preferably has the pair of contact pieces in contact with the inside of the pair of guide walls on the front side with respect to the vehicle and on the rear side with respect to the vehicle with regard to the guide member, respectively. Thus, the electricity-carrying plate is brought into contact with the inside of the guide wall at four points, and the electricity-carrying passage can be further certainly secured.

Moreover, the steering apparatus has a protruding portion projecting from a part of the outer column on the rear side with respect to the vehicle, with regard to the guide groove into the guide groove to restrict movement of the guide member toward the rear side with respect to the vehicle while avoiding interference with the pair of contact pieces. Thus, the limit of telescopic adjustment on the rear side with respect to the vehicle can be defined, regardless of the pair of contact pieces arranged on the rear side with respect to the vehicle.

Moreover, inner side surfaces of the pair of guide walls are surfaces finished to be smooth by grinding processing. Thus, friction force to be generated between the electricity-carrying member and the outer column can be reduced, and the electricity-carrying member can be stably brought into contact with the outer column.

Moreover, resin coating is preferably applied to an inner peripheral surface of the outer column, or an outer peripheral surface of the inner column. Thus, the friction force to be generated between the inner column and the outer column can be reduced, and the inner column can relatively move with comparatively small force upon the second collision.

Moreover, the steering shaft preferably is constructed by fitting a rear steering shaft arranged on the rear side with respect to the vehicle to a front steering shaft arranged on the front side with respect to the vehicle, and resin coating is applied to the rear steering shaft or the front steering shaft in the fitting portion.

Thus, backlash to be generated in the fitting portion of the steering shaft can be prevented.

Advantageous Effect of Invention

According to a steering apparatus of the present invention, the steering apparatus in which a new electricity-carrying passage from a steering wheel to a vehicle body is secured can be provided.

DESCRIPTION OF EMBODIMENT

Figure 1:
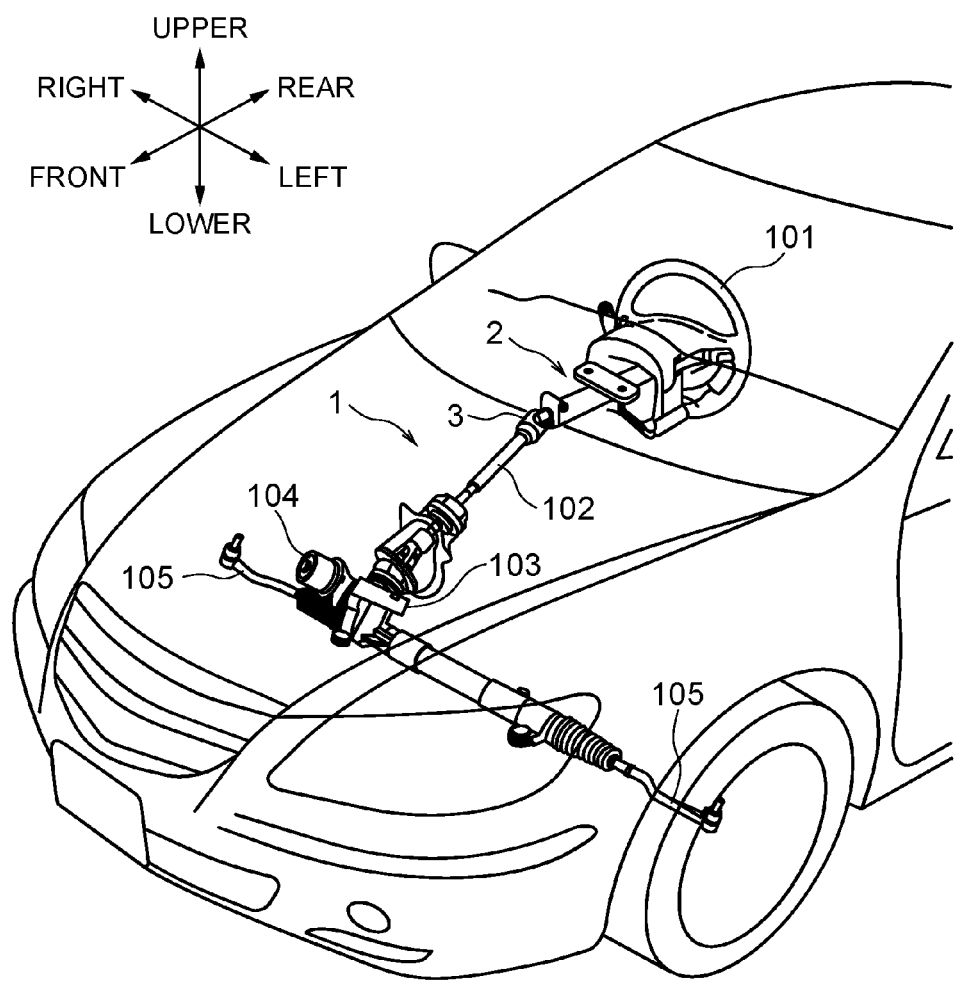
FIG. 1 is a perspective view obtained by viewing a steering mechanism equipped with a steering apparatus according to an embodiment from an oblique front side.

Hereinafter, the embodiment and partially modified examples in which the present invention is applied to a steering apparatus to be used for a rack assist type electric power steering mechanism of a tilt/telescopic adjustment type (hereinafter, simply described as a steering mechanism) will be described in detail with reference to drawings. In addition, upon describing the steering mechanism or the steering apparatus, front and rear, left and right, and upper and lower are shown using arrows in the drawings, and a position or a direction of each member is described according to this. These directions are coincident with directions of a vehicle in a state in which the steering apparatus is mounted in the vehicle.

Structure of Embodiment

FIG. 1 is a perspective view obtained by viewing a steering mechanism 1 equipped with a steering apparatus 2 according to an embodiment of the present application from an oblique front side. As shown in FIG. 1, in order to reduce force required for operating a steering wheel 101, in the steering apparatus 2 of the present embodiment, an electric power assist mechanism 104 assists steering force transmitted from a steering shaft 3 rotatably supported by a steering column and an intermediate shaft 102 to a steering gear 103 to reciprocate a rack (not shown) in left and right directions, thereby steering front wheels through left and right tie rods 105 coupled to the rack.

FIG. 2 to FIG. 5 each are a perspective view, a side view, a plan view, and a longitudinal cross-sectional view of a steering apparatus 2 according to the embodiment of the present application. As shown in FIG. 2 to FIG. 5, the steering apparatus 2 has, as main components, a cylindrical outer column 10 being an aluminum alloy die-casting molded product to construct a front part, an inner column 11 made of a steel pipe to construct a rear part, and a tilt bracket 12 holding the outer column 10.

Steering Column

Figure 5:
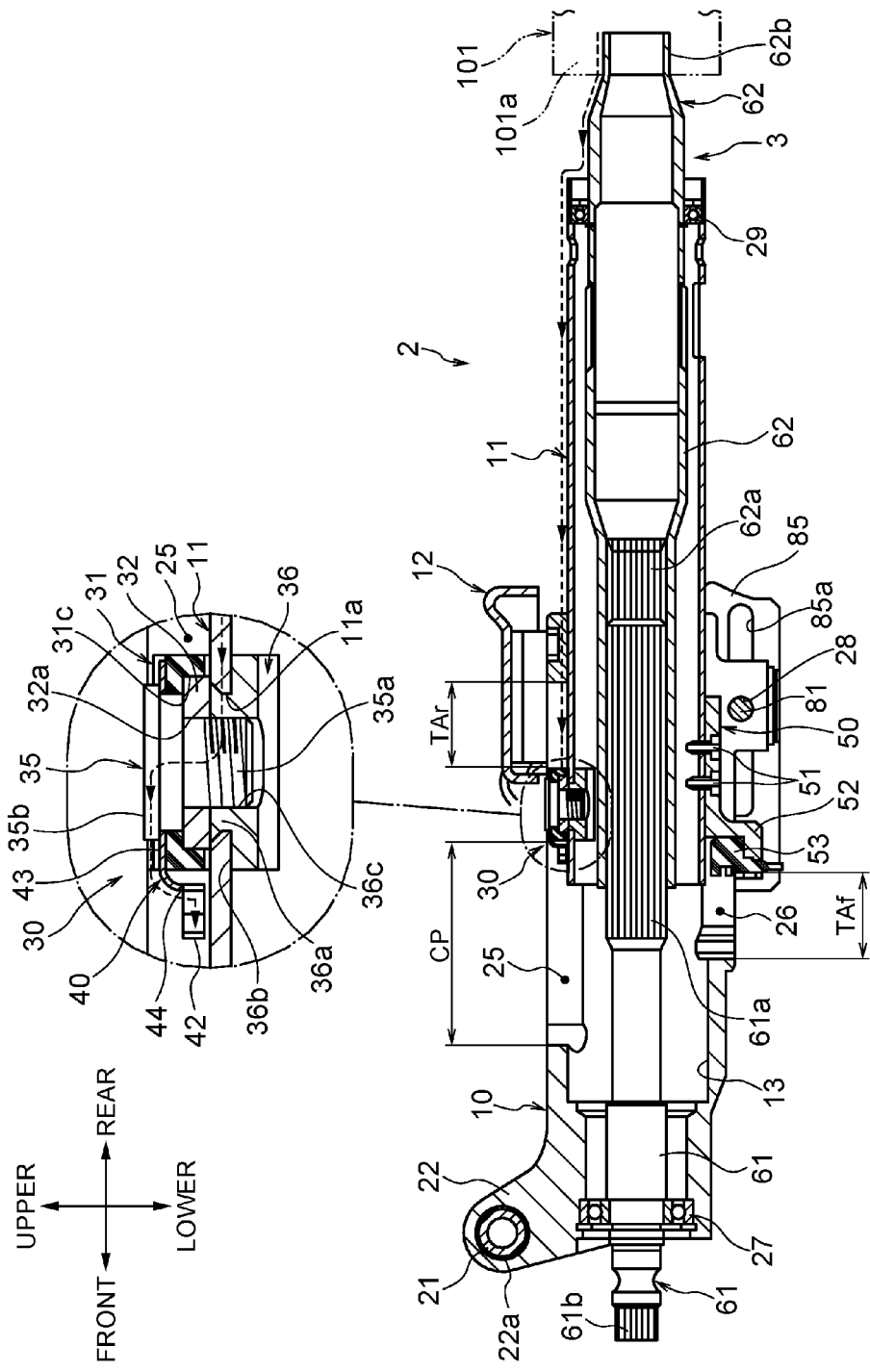
FIG. 5 is a longitudinal cross-sectional view of the steering apparatus according to the embodiment.

The steering column is constructed of the outer column 10 arranged on a front side, and the inner column 11 arranged on a rear side. As shown in FIG. 5, in the outer column 10, a holding cylindrical hole 13 having an inner diameter slightly larger than an outer diameter of the inner column 11 is formed along an axial direction, and the inner column 11 is fitted into this holding cylindrical hole 13.

To an outer peripheral surface in a portion of the inner column 11 to be fitted into the holding cylindrical hole 13, resin coating having a low coefficient of friction is applied, and the outer column 10 and the inner column 11 cause relative sliding against comparatively small friction force by fastening both upon secondary collision to be mentioned later.

Figure 3:
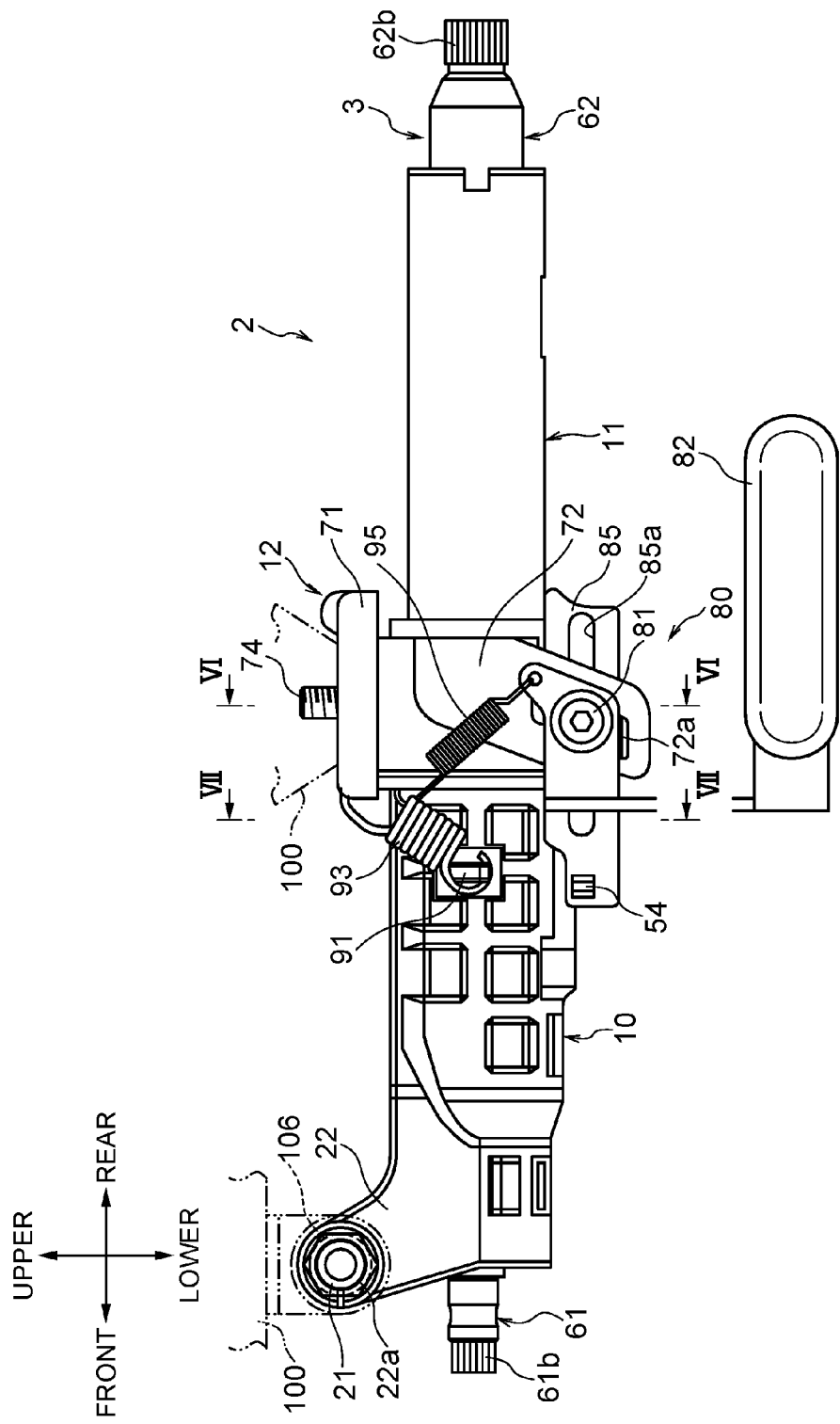
FIG. 3 is a side view of the steering apparatus according to the embodiment.

As shown in FIG. 3, the outer column 10 has, in an upper portion in a front end thereof, a pivot boss 22 in which a collar 21 made of a steel pipe is held in a boss hole 22a penetrating therethrough in left and right directions, the outer column 10 being turnably attached to a vehicle body 100 through a pivot bolt 106 inserted into the collar 21.

Figure 6:
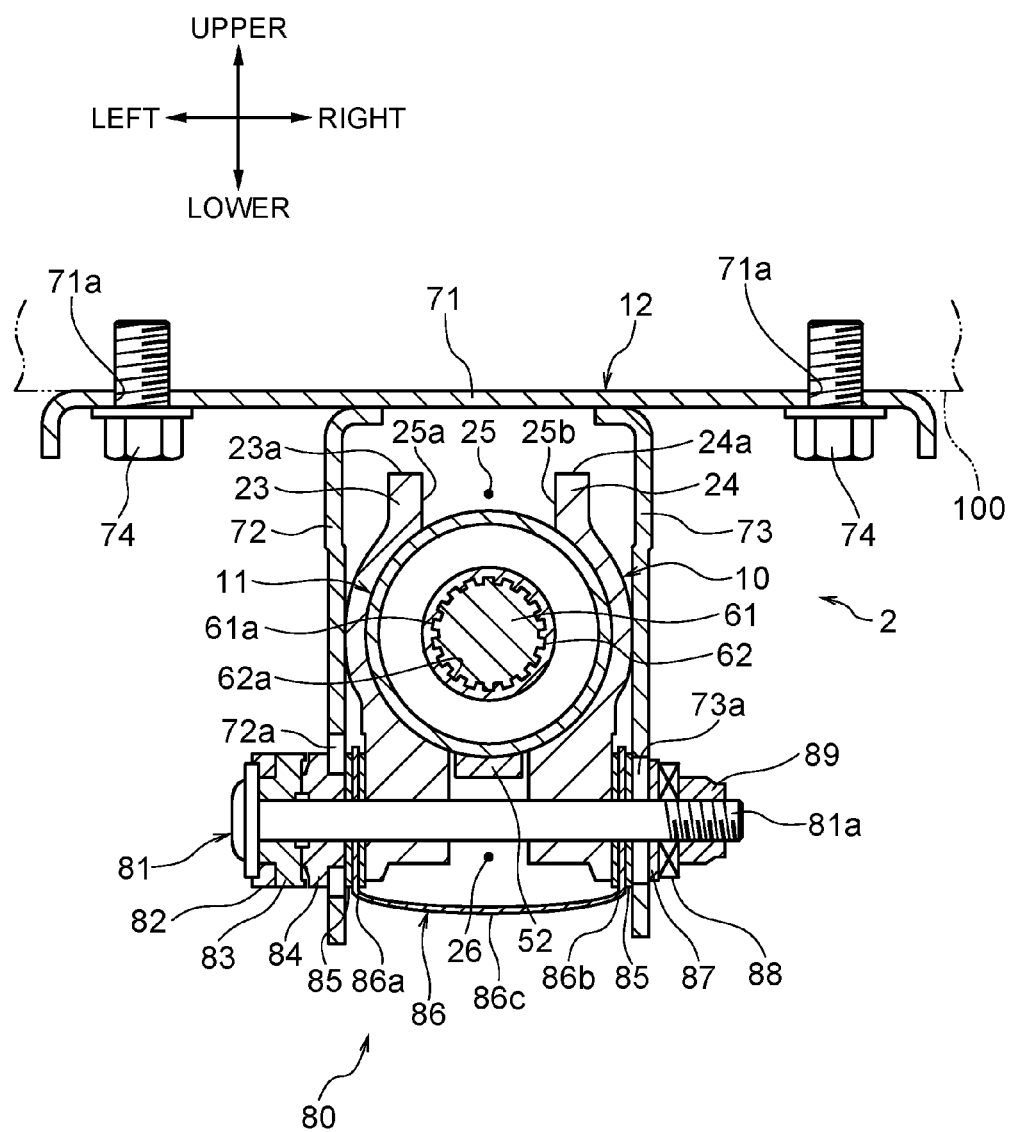
FIG. 6 is a cross-sectional view showing a VI-VI cross-section shown in FIG. 3.

As shown in FIG. 6, in an upper portion of the outer column 10, a pair of left and right guide walls 23, 24 projecting on an upper side and extending in front and rear directions are formed, and therebetween a guide groove 25 penetrating through the outer column in a radial direction and extending in the front and rear directions is provided therebetween. In a lower portion on the rear side of the outer column 10, a slit 26 penetrating therethrough in the radial direction, extending in the front and rear direction, and being opened on the rear side is provided.

As shown in FIG. 5, on an inner side in a front end portion of the outer column 10, a ball bearing 27 supporting a front steering shaft 61 to be mentioned later in a freely rotatable manner is fitted thereinto. Moreover, in the lower portion on the rear end side of the outer column 10, a through hole 28 for a fastening bolt, penetrating in the left and right directions is perforated, and a fastening bolt 81 of a tilt/telescopic adjustment mechanism 80 to be mentioned later is inserted in this through hole 28.

Moreover, as shown in FIG. 5, on an inner side in a rear end portion of the inner column 11, a ball bearing 29 is fitted in order to support a rear steering shaft 62 to be mentioned later in the freely rotatable manner.

Upper Stopper

Figure 7:
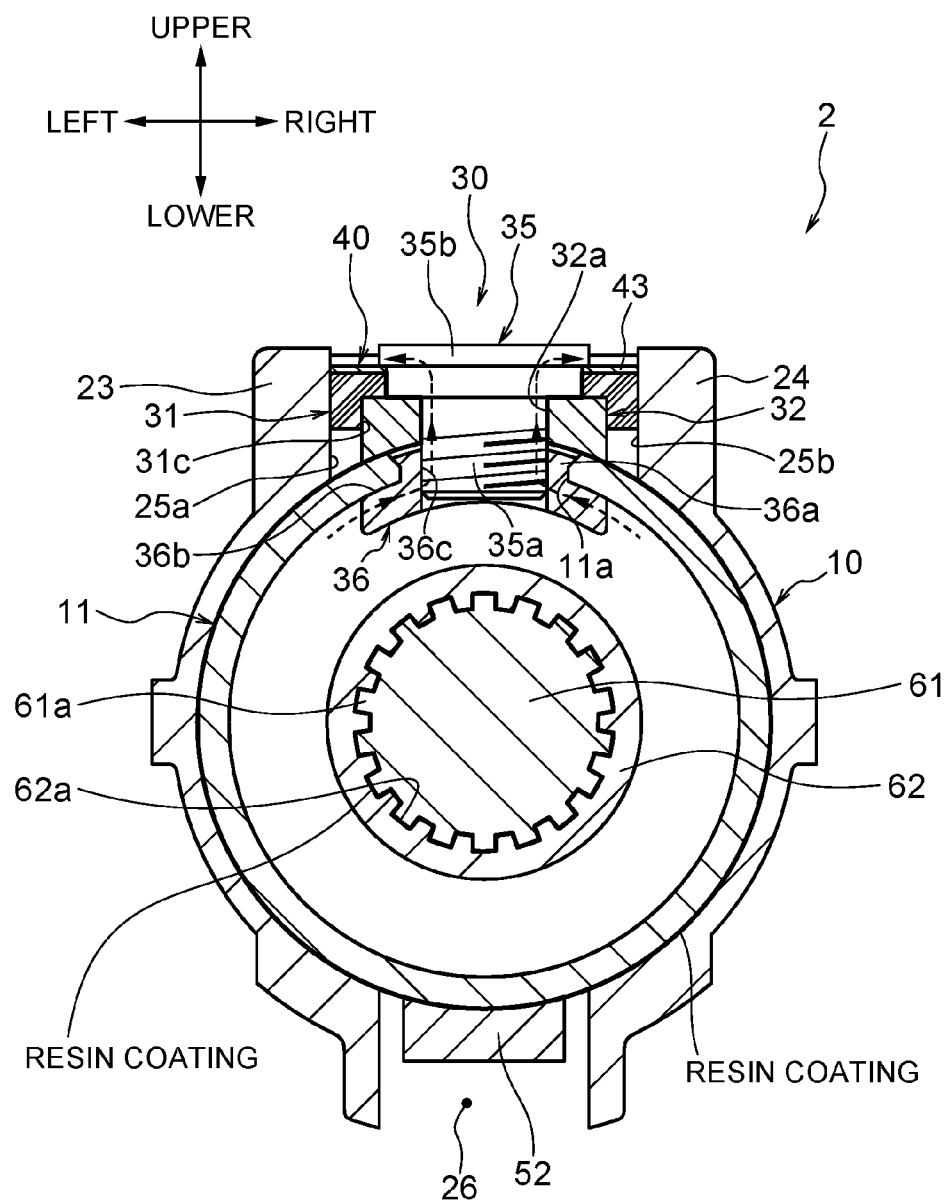
FIG. 7 is a cross-sectional view showing a VII-VII cross-section shown in FIG. 3.

As shown in FIG. 5 and FIG. 7, on an upper surface on the front side of the inner column 11, an upper stopper 30 arranged in the guide groove 25 of the outer column 10 is installed. By engagement between the upper stopper 30 and the guide walls 23, 24 of the guide groove 25, relative rotation between the outer column 10 and the inner column 11 is prevented and a relative movement range between the inner column 11 and the outer column 10 in the axial direction is regulated. That is, the upper stopper 30 abuts with the part of the outer column 10 on the rear side of the guide groove 25 to restrict a telescopic adjustment range of the inner column 11 (shown by a mark TAr in FIG. 5) toward the rear side, and the upper stopper 30 abuts with the part of the outer column 10 on the front side of the guide groove 25 to restrict a movement range of the inner column 11 (shown by a mark CP in FIG. 5) upon the secondary collision.

The upper stopper 30 is composed of a guide member 31 being a resin injection molded product and a stopper base 32 made of metal, and is attached to the inner column 11 by a stepped low head bolt 35 with a hexagon socket, and a nut plate 36 fixed to the inner column 11, both being metal fittings.

Figure 4:
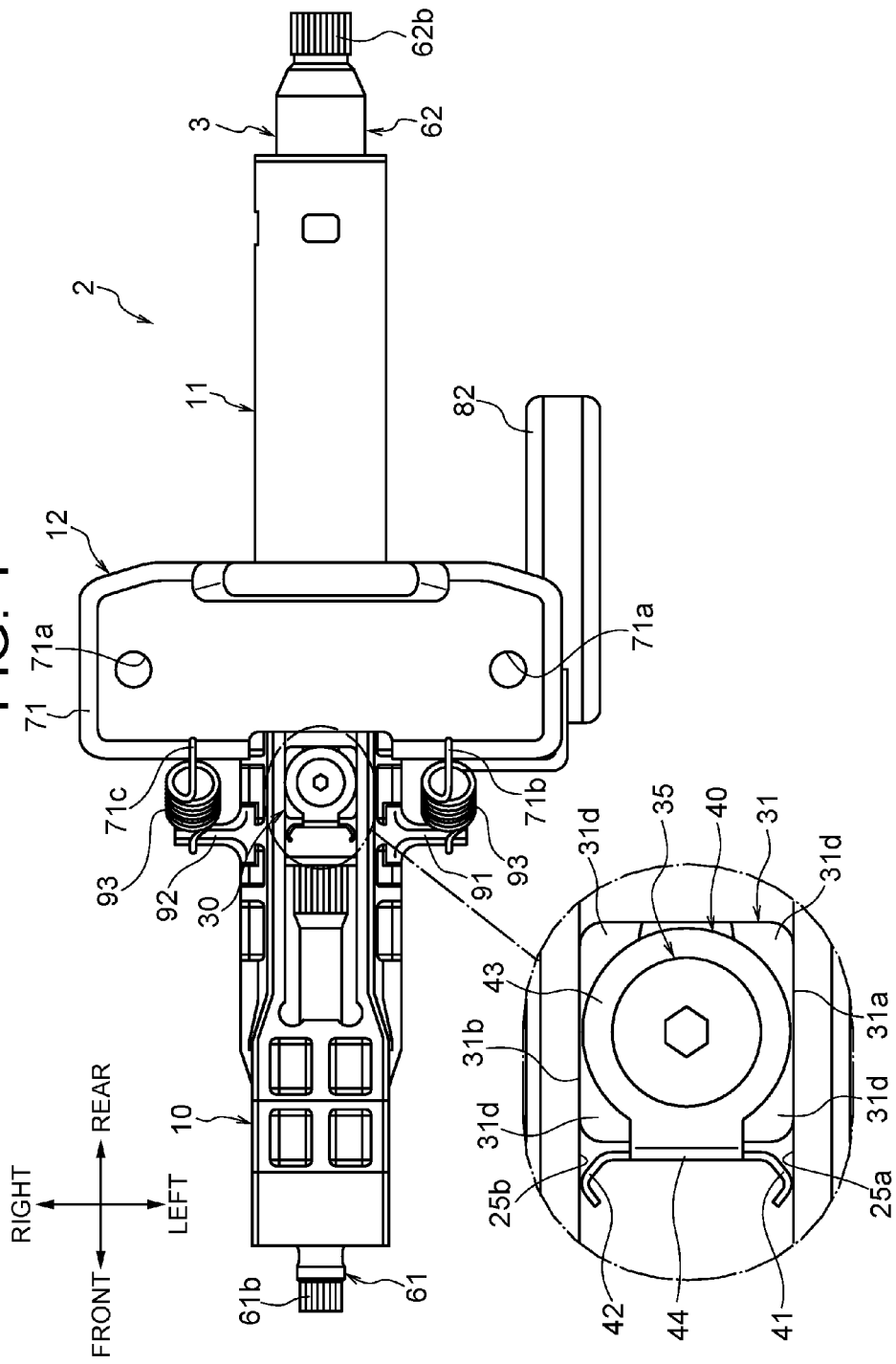
FIG. 4 is a plan view of the steering apparatus according to the embodiment.

As shown in FIG. 4, the guide member 31 has a substantial square shape in a plan view, and left and right side edges 31a, 31b slidingly contact with inner walls 25a, 25b of the guide walls 23, 24. As shown in FIG. 5 and FIG. 7, in the lower portion of the guide member 31, a recess portion 31c into which the stopper base 32 is inserted is formed.

As shown in FIG. 5 and FIG. 7, the stopper base 32 is formed in a center thereof with a through hole 32a into which a threaded shaft 35a of the stepped low head bolt is inserted. Moreover, a lower surface of the stopper base 32 is formed into a curved shape having a curvature corresponding to the curvature of the outer peripheral surface of the inner column 11, and as shown in FIG. 7, closely contacts with the inner column 11 in an assembled state. A portion of the inner column 11 with which the stopper base 32 is brought into contact is not applied with the above-mentioned resin coating by masking the portion of the inner column 11 upon applying the resin coating, and the stopper base 32 is directly brought into contact with the outer peripheral surface of the inner column 11 to enable electricity carriage.

As shown in FIG. 7, the nut plate 36 has, in a center on an upper surface, a boss portion 36a inserted into a through hole 11a formed in the inner column 11, and is formed with a thread hole 36c penetrating from an upper end surface of the boss portion 36a to a lower end of the nut plate 36. Moreover, an upper surface 36b of the nut plate 36 is formed into a curved shape having a curvature corresponding to the curvature of the inner peripheral surface of the inner column 11, and as shown in FIG. 7, closely contacts with the inner column 11. In the present embodiment, the stopper base 32 is fixed to the inner column 11 by caulking the boss portion 36a in a state in which the boss portion 36a is inserted into the through hole 11a, and then a groove of the thread hole 36c is formed by tapping. In addition, the upper stopper 30 may be fastened to the inner column 11 by a blind rivet in place of the nut plate 36.

Electricity-Carrying Plate

As shown in FIG. 4, between the guide member 31 and an upper stepped portion 35b of the stepped low head bolt 35, an electricity-carrying plate 40 having contact pieces 41, 42 having a substantial V shape in a plan view in left and right on the front side with respect to the vehicle is interposed. The electricity-carrying plate 40 is positioned and subjected to rotation stop by four locking protrusions 31d installed in a projecting manner on an upper surface of the guide member 31. The electricity-carrying plate 40 is a punched press-molded product of a spring steel plate having elasticity, and as a material of the electricity-carrying plate 40, a material such as a phosphor bronze plate in addition to the spring steel plate can be used.

The contact pieces 41, 42 extend from left and right ends of an apron portion 44 sagged from a front end of a circular plate body 43 to a lower side, respectively, and are formed in such a manner that bent portions are brought into contact with the inner walls 25a, 25b of the guide walls 23, 24 by elastic deformation at a predetermined contact pressure. The contact pieces 41, 42 are constructed in such a manner, thereby following slight undulation on the inner walls 25a, 25b, or slight rotation of the inner column to consistently enable contact with the inner walls 25a, 25b. The inner walls 25a, 25b of the guide walls 23, 24 are finished to be smooth by grinding processing or the like in order to secure stable contact with the contact pieces 41, 42, respectively.

Lower Stopper

As shown in FIG. 5, on the lower surface on a leading end side of the inner column 11, a lower stopper 50 being an aluminum alloy die-casting molded product to be freely fitted to the slit 26 is installed. In the case of the present embodiment, the lower stopper 50 defines the telescopic adjustment range of the inner column 11 (shown by the mark TAf in FIG. 5) toward the front side by abutment of a buffer block 53 to be mentioned later with the part of the outer column 10 on the front side of the slit 26.

The lower stopper 50 is fixed to the inner column 11 by a pair of front and rear resin pins 51, and upon the secondary collision, the buffer block 53 collides with the part of the outer column 10 on the front side of the slit 26. Thus, the resin pin 51 breaks and drops from the inner column 11 to allow further movement of the inner column 11 toward the front side.

In a front end of the lower stopper 50, a buffer holding portion 52 having a substantial L shape in a cross section is formed to project toward the lower side. To this buffer holding part 52, the buffer block 53 made of rubber is attached. Even if the buffer block 53 collides with the part of the outer column 10 on the front side of the slit 26 upon telescopic adjustment, the buffer block 53 absorbs impact of the collision so as to cause no damage of the resin pin 51. In addition, from left and right both sides of the lower stopper 50, locking arms 54 (shown in FIG. 3) with which a friction plate 85 to be mentioned later engages are extended, respectively.

Steering Shaft

As shown in FIG. 5, the steering shaft 3 is constructed of a front steering shaft 61 and a rear steering shaft 62 being spline-connected to each other in the steering column in order to enable the telescopic adjustment. As mentioned above, the steering shaft 3 is supported, in the freely rotatable manner, by the ball bearing 27 fitted into the outer column 10 in the front end thereof, and the ball bearing 29 fitted into the inner column 11 in the rear end thereof.

The front steering shaft 61 molded by rolling, broaching processing or the like from a steel round bar as a raw material, has a male spline 61a on an outer periphery in a latter half portion. Meanwhile, the rear steering shaft 62 is molded by drawing, broaching or the like from a steel pipe as the raw material, has a female spline 62a fitted to the male spline 61a of the front steering shaft 61 on an inner periphery in a former half portion.

The male spline 61a of the front steering shaft 61 is applied with the resin coating in order to prevent the backlash with the female spline 62a of the rear steering shaft 62.

In a leading end of the front steering shaft 61, a serration 61b on which a universal joint (not shown) is fitted is formed, and in a trailing end of the rear steering shaft 62, a serration 62b onto which a boss 101a of a steering wheel 101 is fitted is formed, as shown by a dashed line in FIG. 5.

Tilt Bracket

As shown in FIG. 3 and FIG. 6, the tilt bracket 12 has a top plate 71 extending in left and right directions, and left and right side plates 72, 73 welded to a lower surface of this top plate 71. The top plate 71 is fastened to the vehicle body 100 by bolts 74 passing through bolt holes 71a. An interval between the left and right side plates 72 and 73 is set to be somewhat larger than a width of the outer column 10 in left and right directions in a free state. The left and right side plates 72, 73 are formed with elongate holes 72a, 73a for tilt adjustment. The elongate holes 72a, 73a for tilt adjustment are formed in an arc shape centering on the above-mentioned pivot boss 22.

As shown in FIG. 6, in a lower portion of the tilt bracket 12, a tilt/telescopic adjustment mechanism 80 is provided for the tilt adjustment and the telescopic adjustment of the steering column 2. The tilt/telescopic adjustment mechanism 80 performs fastening and release, in response to operation by a user, using the fastening bolt 81 inserted into the fastening bolt through hole 28 of the outer column 10 from a left side. Thus, the tilt/telescopic adjustment mechanism 80 performs fixing of a tilt/telescopic position and release therefrom.

As shown in FIG. 6, on the fastening bolt 81, between a head portion thereof and the left side plate 72 of the tilt bracket 12, an operation lever 82 subjected to rotation operation by the driver, a movable cam 83 rotating integrally with the operation lever 82, and a fixed cam 84 nonrotatably engaged with the elongate hole for tilt adjustment 72a in a right end are fitted. On end surfaces of the fixed cam 84 and the movable cam 83, which face each other, complementarily shaped inclined cam faces are formed. In response to rotation of the operation lever 82, the fixed cam 84 and the movable cam 83 are intermeshed and approach each other to release fastening by the fastening bolt 81, and repel and move away from each other to generate tension in the fastening bolt 81, thereby performing the fastening.

As shown in FIG. 6, between the outer column 10 and the left and right side plates 72, 73 of the tilt bracket 12, left and right each two friction plates 85 whose leading ends engage with a locking arm 54 of a lower stopper 50, and an intermediate friction plate 86 having left and right end plates 86a, 86b which are, respectively, interposed in between the each two friction plates 85, are externally fitted on the fastening bolt 81. The friction plates 85, which engage with the lower stopper 50 as described above, increase the number of friction surfaces and reinforce the force for holding the inner column 11.

As shown in FIG. 3 and FIG. 5, the friction plate 85 is formed with an elongate hole 85a extending in front and rear direction in order to allow the relative movement to the fastening bolt 81 and to enable the telescopic adjustment. As shown in FIG. 6, the intermediate friction plate 86 has a shape in which a pair of left and right end plate portions 86a, 86b each consisting of a square plate-like member formed with a round hole in a center thereof through which the fastening bolt 81 passes are coupled by a coupling plate portion 86c.

As shown in FIG. 6, outside a right side plate 73, a pressing plate 87 and a thrust bearing 88 are fitted on the fastening bolt 81, and these are fastened together with other members by a nut 89 screwed onto an external thread 81a of the fastening bolt 81.

Figure 2:
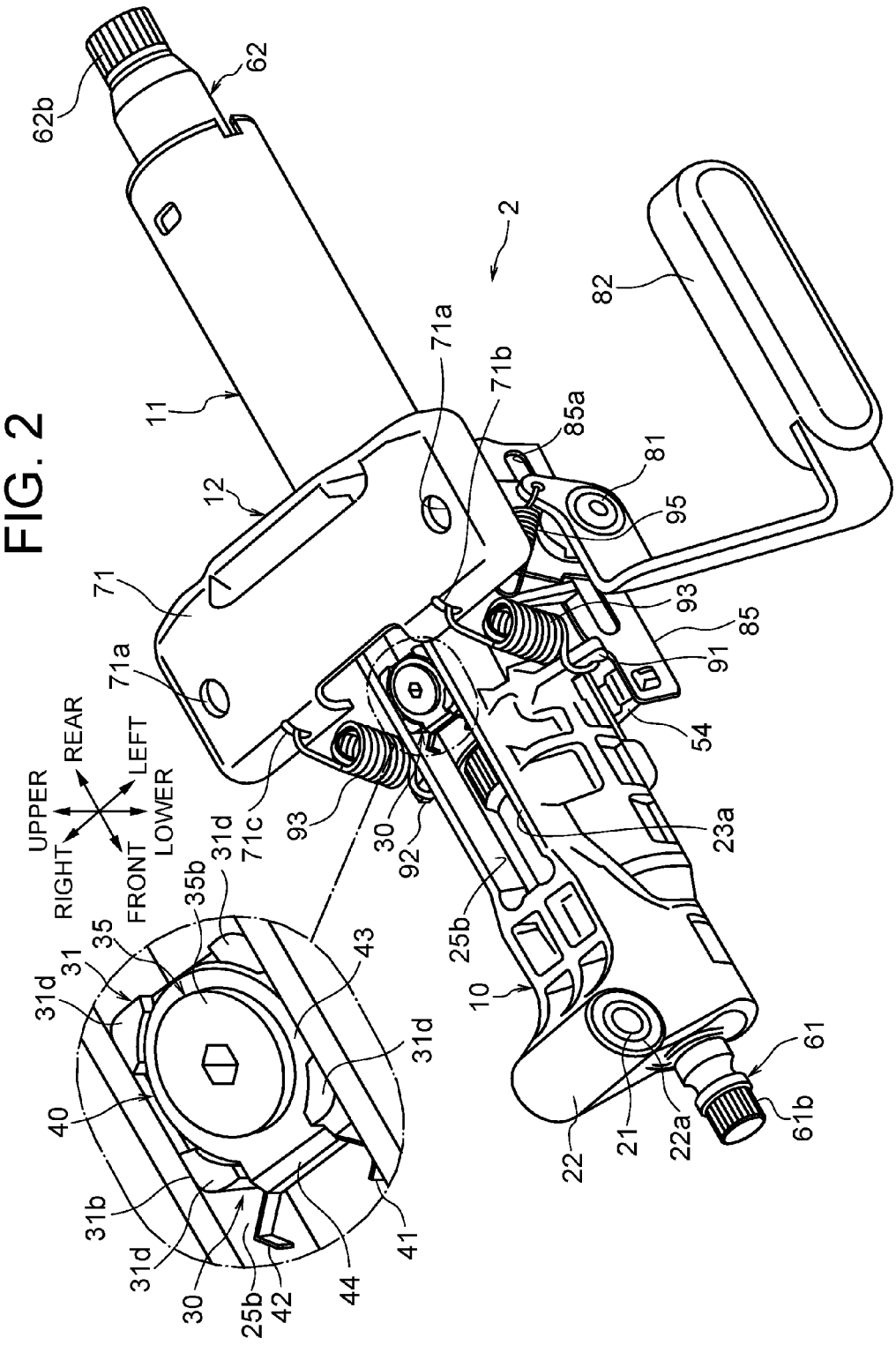
FIG. 2 is a perspective view obtained by viewing the steering apparatus according to the embodiment from an oblique front side.

As shown in FIG. 2 and FIG. 4, left and right side surfaces of the outer column 10 are provided with hook portions 91, 92 projecting in a horizontal direction, respectively, and coil springs 93 extend between the left and right locking holes 71b, 71c drilled on the top plate 71 of the tilt bracket 12, and the hook portions 91, 92, respectively. The coil spring 93 partially bears weight of the steering column, the steering wheel 101 and the like upon the tilt adjustment to ease operation of the tilt adjustment by the user.

As shown in FIG. 3, a coil spring 95 also extends between the operation lever 82 and the tilt bracket 12. The coil spring 95 energizes the operation lever 82 so as to rotate on a fastening side to ease operation of the operation lever 82 when the user operates the lever toward the fastening side, and to prevent the operation lever 82 from rotating toward a release side against an intention of the driver by wobble of an automobile, or the like.

Operation of Embodiment

As shown in FIG. 6, if the driver turns the operation lever 82 toward the fastening side, a ridge on an inclined cam face of the movable cam 83 runs on a ridge on the inclined cam face of the fixed cam 84 to pull the fastening bolt 81 on the left side, and meanwhile, to press the fixed cam 84 on the right side. Thus, the left and right side plates 72, 73 fasten the lower portion of the outer column 10 from left and right to restrict the movement of the steering column in a tilt direction, and simultaneously the movement of the inner column 11 in the axial direction is restricted by friction force generated by fastening of the inner column 11 by the outer column 10, and friction force generated on the friction plates 85.

On the other hand, if the driver turns the operation lever 82 in a release direction, as mentioned above, the left and right side plates 72, 73 of the tilt bracket 12 in which the interval in the free state is larger than the width of the outer column 10 elastically restore, respectively. Thus, both of restriction on the movement of the outer column 10 in the tilt direction and restriction on the movement of the inner column 11 in the axial direction are released, so that the user becomes able to adjust the position of the steering wheel 101.

In the present embodiment, even if fastening force of the outer column 10 by the tilt/telescopic adjustment mechanism 80 is set to be large, the resin coating having the low coefficient of friction is applied to the outer peripheral surface of the inner column 11, and therefore the friction force generated by the fastening of the inner column 11 by the outer column 10 is kept low. Thus, even when the light-weight driver secondarily collides with the steering wheel 101 by the crash of the automobile, the inner column 11 comparatively easily moves toward the front side, and the impact of the secondary collision is relieved. Moreover, even if machining accuracy of the holding cylindrical hole 13 of the outer column 10 is lowered, low-friction force can be kept by the above-described resin coating having the low friction coefficient, and therefore machining cost can be reduced.

If the inner column 11 moves toward the front side by the impact of the secondary collision, the buffer block 53 installed in the lower stopper 50 collides with a part of the outer column 10 on the front side with respect to the vehicle with regard to the slit 26. If the inner column 11 further moves toward the front side from this state, the resin pin 51 is shear-fractured, so that the inner column 11 is disengaged from the lower stopper 50 to become able to further move toward the front side without receiving the restriction on the movement by the friction plate 85.

Operation of Electricity-Carrying Plate

Also in the steering apparatus 2 of the present embodiment, as shown by dashed line arrows in FIG. 5, the electricity-carrying passage continuous from the steering wheel 101 to the inner column 11 through the rear steering shaft 62 and the ball bearing 29 is secured. However, the resin coating is applied to an outer periphery of the inner column 11, and therefore a direct electricity-carrying passage from the inner column 11 supporting the rear steering shaft 62 to the outer column 10 is blocked. Moreover, in the steering apparatus 2 of the present embodiment, the resin coating is applied to the male spline 61a of the front steering shaft 61, and therefore the electricity-carrying passage from the rear steering shaft 62 to which the steering wheel 101 is attached to the front steering shaft 61 is also blocked.

The electricity-carrying plate 40 solves this problem, and as described below, the electricity-carrying passage continuous from the inner column 11 to the vehicle body 100 is secured. More specifically, as shown by dashed line arrows in FIG. 5 and FIG. 7, the electricity-carrying passage continuous from the inner column 11 to the nut plate 36, the stepped low head bolt 35, the electricity-carrying plate 40, and the outer column 10 in this order is secured. From the outer column 10, the electricity-carrying passage continuous to the vehicle body 100 through the tilt bracket 12 is secured. In addition, the electricity can also be carried to the vehicle body 100 through the pivot boss 22, but in several cases, a resin spacer is inserted therebetween to achieve low friction and backlash filling, in such cases the electricity-carrying passage is blocked.

First Modified Example

Figure 8:
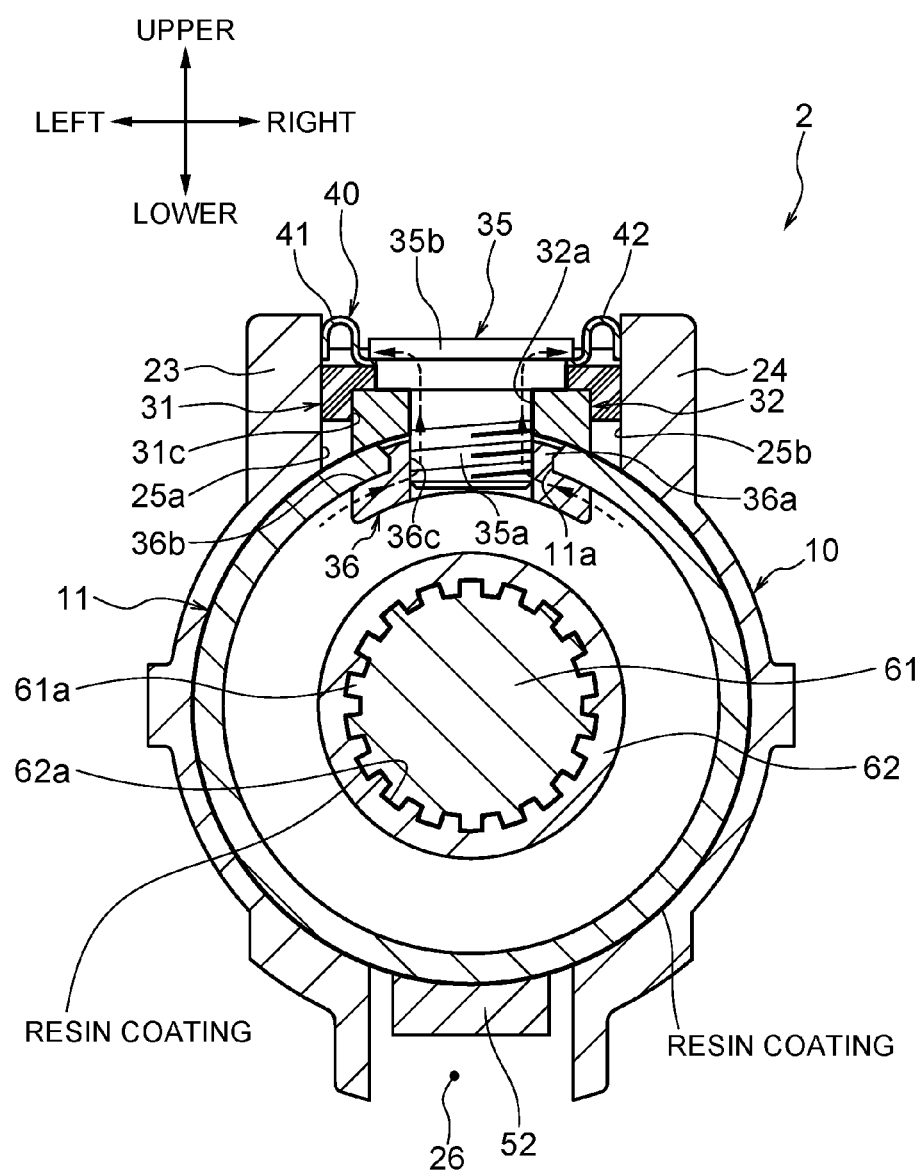
FIG. 8 is a cross-sectional view of an essential portion according to a first Modified Example of the embodiment.

Next, with reference to FIG. 8, a first Modified Example of the above-described embodiment is described. The first Modified Example is different from the above-described embodiment in a height of guide walls 23, 24 and a shape of an electricity-carrying plate 40. However, other constructions are identical with the constructions in the above-described embodiment, and redundant description is omitted.

As shown in FIG. 8, in the first Modified Example, left and right guide walls 23, 24 are formed to be somewhat higher than the walls in the embodiment, and contact pieces 41, 42 of the electricity-carrying plate 40, rising in an inverted U shape from a central portion in front and rear directions slightly elastically deform inside, and are brought into contact with the left and right guide walls 23, 24 at a predetermined contact pressure. Also in such a construction, operation and an effect similar to the operation and the effect in the above-described embodiment can be obtained.

Second Modified Example

Figure 9:
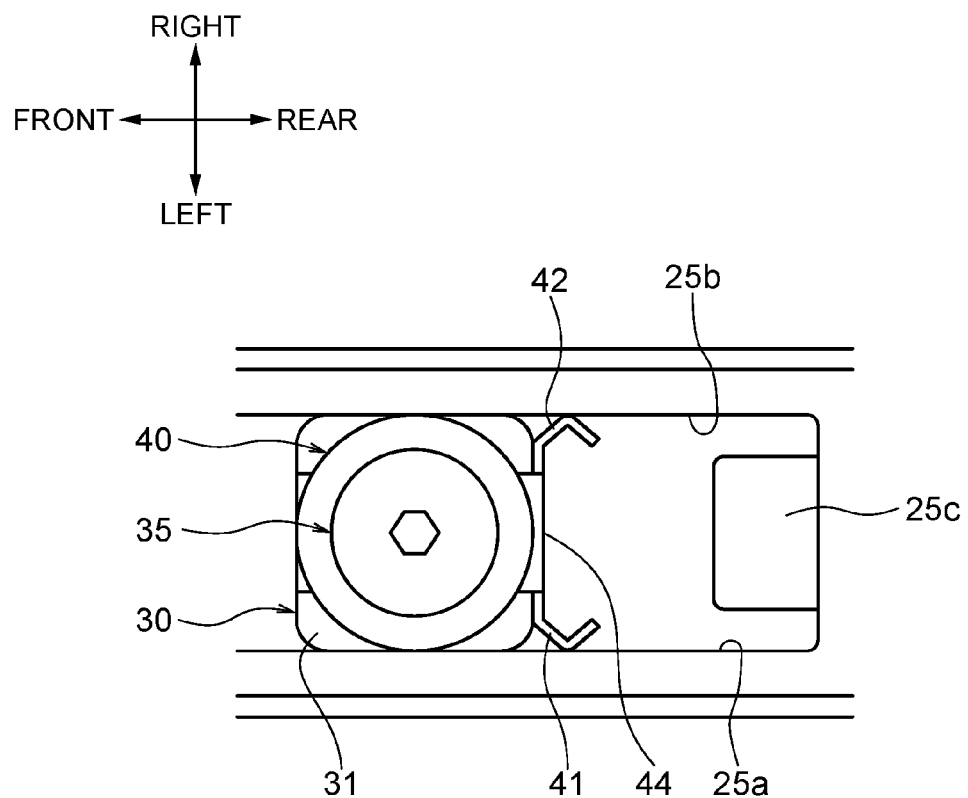
FIG. 9 is a plan view of an essential portion according to a second Modified Example of the embodiment.

Next, with reference to FIG. 9, a second Modified Example of the above-described embodiment is described. The second Modified Example is different from the above-described embodiment in an outer column and an electricity-carrying plate, but other constructions are identical with the constructions in the above-described embodiment, and therefore reference signs same with the signs in the above-described embodiment are placed to parts corresponding thereto, and redundant description is omitted.

In the present second Modified Example, as is different from the above-described embodiment, contact pieces 41, 42 and an apron portion 44 of an electricity-carrying plate 40 are arranged on a rear side with respect to a vehicle with regard to a guide member 31. The apron portion 44 is arranged so that a front side surface thereof is brought into contact with the guide member 31.

Moreover, in the present second Modified Example, as is different from the above-described embodiment, a protruding portion 25c projecting toward the front side with respect to the vehicle is formed in a part of the outer column on the rear side of a guide groove 25. The protruding portion 25c is projected to be longer than a length of the contact pieces 41, 42 in front and rear directions of the vehicle to form, between it and inner walls 25a and 25b, spaces into which the contact pieces 41, 42 enter, respectively.

The protruding portion 25c defines a limit of telescopic adjustment on the rear side. That is, if a steering wheel is pulled toward the rear side with respect to the vehicle, and the apron portion 44 abuts with the protruding portion 25c, an inner column becomes unable to further move toward the rear side with respect to the vehicle, and the steering wheel also becomes unable to further move toward the rear side with respect to the vehicle.

According to the present second Modified Example described above, the electricity-carrying passage continuous from the inner column to a vehicle body can be secured in a manner similar to the above-described embodiment. Moreover, the contact pieces 41, 42 and the apron portion 44 of the electricity-carrying plate 40 are arranged on the rear side with respect to the vehicle with regard to the guide member 31 to facilitate to take a long movement distance of the inner column for impact absorption upon secondary collision.

Third Modified Example

Figure 10:
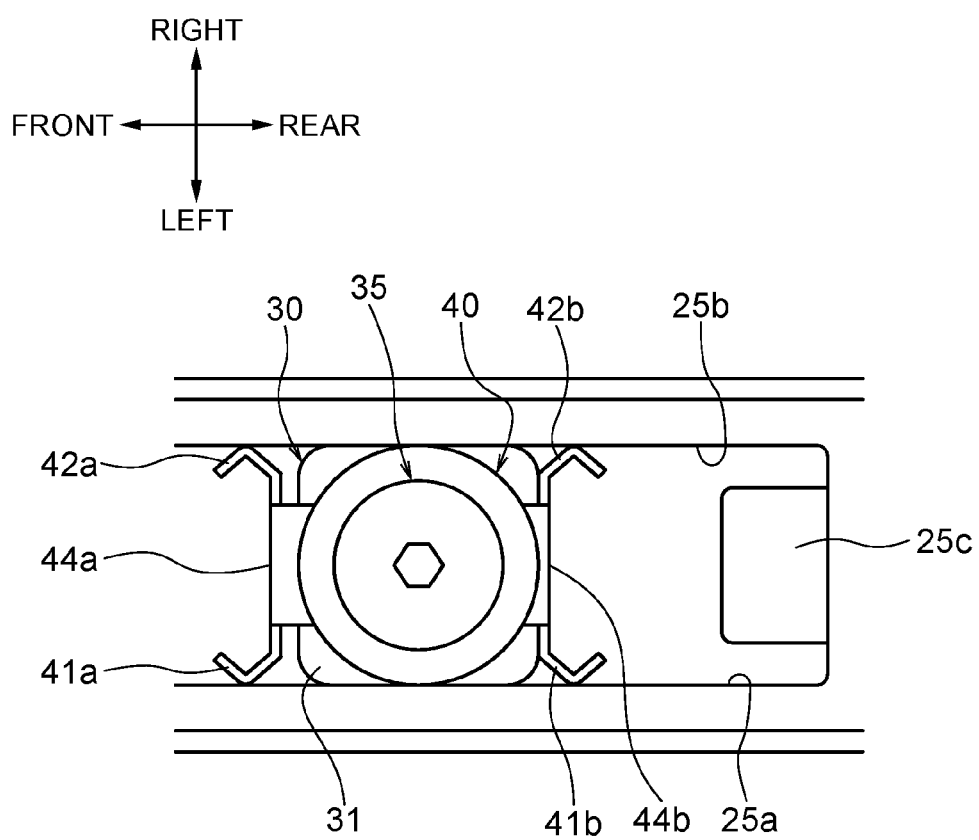
FIG. 10 is a plan view of an essential portion according to a third Modified Example of the embodiment.

Next, with reference to FIG. 10, a third Modified Example of the above-described embodiment is described. The third Modified Example is different from the above-described embodiment in an outer column and an electricity-carrying plate, but other constructions are identical with the constructions in the above-described embodiment, and therefore reference signs same with the signs in the above-described embodiment are placed to parts corresponding thereto, and redundant description is omitted.

An electricity-carrying plate 40 in the present third Modified Example has, in addition to contact pieces 41a, 42a and an apron portion 44a arranged on a front side with respect to a vehicle with regard to a guide member 31, contact pieces 41b, 42b and an apron portion 44b arranged on a more rear side with respect to the vehicle than the guide member 31.

Moreover, in the present third Modified Example, as is different from the above-described embodiment, a rear side portion of the outer column, defining a guide groove, is formed with a protruding portion 25c projecting toward the front side with respect to the vehicle. The protruding portion 25c is projected to be longer than a length of the contact pieces 41b, 42b in front and rear directions of the vehicle, thereby forming between it and the inner walls 25a and 25b, spaces into which the contact pieces 41b, 42b enter, respectively.

The protruding portion 25c defines a limit of telescopic adjustment on the rear side. That is, if a steering wheel is pulled toward the rear side with respect to the vehicle, and the apron portion 44 abuts with the protruding portion 25c, the inner column becomes unable to further move toward the rear side with respect to the vehicle, and the steering wheel also becomes unable to further move toward the rear side with respect to the vehicle.

According to the present third Modified Example described above, the electricity-carrying passage continuous from the inner column to a vehicle body can be secured in a manner similar to the above-described embodiment. Moreover, according to the present third Modified Example, the electricity-carrying plate 40 is brought into contact with the outer column at four points, and therefore the electricity-carrying passage can be further certainly ensured. In particular, in a state in which fastening onto the inner column by the outer column is released, backlash is caused between the inner column and the outer column, but even in such a state, the electricity-carrying passage can be further certainly secured.

Although the description on the specific embodiments and partially modified examples will be finished as stated above, the aspect of the present invention is not limited thereto.

For example, the above-described embodiment is a rack assist type electric power steering apparatus to which the present invention is applied. However, the present invention can be obviously applied to a column assist type electric power steering apparatus, and the like.

Moreover, a specific construction and shape of the steering column, the tilt/telescopic adjustment mechanism, the upper stopper, the electricity-carrying plate, and the like can also be appropriately altered within the scope from which the spirit of the present invention is not departed. For example, the electricity-carrying plate does not necessarily have two contact pieces, and may have one or three or more pieces. Moreover, the electricity-carrying plate 40 may be configured so as to be directly brought into contact with the inner column 11.

REFERENCE SIGNS LIST 1 steering mechanism
2 steering apparatus
3 steering shaft
10 outer columns
11 inner column
11a through hole
12 tilt bracket
13 holding cylindrical hole
21 collar
22 pivot boss
22a boss hole
23, 24 guide wall
23a, 24a upper surface
25 guide groove
25a, 25b inner wall
25c protruding portion
26 slit portion
27 ball bearing
28 through hole
29 ball bearing
30 upper stopper
31 guide member
31a left side edge
31b right side edge
31c recess portion
31d locking protrusion
32 stopper base
32a through hole
35 stepped low head bolt
36 nut plate
36a boss portion
36b upper surface
36c thread hole
40 electricity-carrying plate
41, 42, 41a, 41b, 42a, 42b contact piece
43 plate body
44, 44a, 44b apron portion
50 lower stopper
51 resin pin
52 buffer holding portion
53 buffer block
54 locking arm
61 front steering shaft
61a male spline
61b serration
62 rear steering shaft
62a female spline
62b serration
71 top plate
72 left side plate
72a elongate hole for tilt adjustment
73 right side plate
73a elongate hole for tilt adjustment
80 tilt/telescopic adjustment mechanism
81 fastening bolt
81a external thread
82 operation lever
83 movable cam
84 fixed cam
85 friction plate
85a elongate hole
86 intermediate friction plate
86a left end plate portion
86b right end plate portion
86c coupling plate portion
87 pressing plate
88 thrust bearing
89 nut
91, 92 hook portion
93 coil spring
95 coil spring
100 vehicle body
101 steering wheel
102 intermediate shaft
103 steering gear
104 electric power assist mechanism
105 tie rod
106 pivot bolt

What is claimed is:

1. A steering apparatus, comprising:
   a steering shaft made of a material having conductivity, the steering shaft including a fitting portion transmitting steering force and being extendable in an axial direction, the fitting portion being applied with a resin coating;

an outer column made of a material having conductivity, the outer column rotatably supporting the steering shaft, the outer column being provided with a guide groove formed therethrough in a radial direction and extending in an axial direction and a pair of guide walls projecting outward in the radial direction and extending along the guide groove on both sides of the guide groove;

an inner column made of a material having conductivity, said inner column being fitted in said outer column to enable relative movement to each other in said axial direction, and rotatably supporting said steering shaft;

a resin coating applied to an inner peripheral surface of said outer column, or an outer peripheral surface of said inner column;

a guide member made of a resin, the guide member being received in said guide groove and slidingly in contact with the guide walls, the guide member being attached to said inner column;

an electricity-carrying plate made of a metal plate having conductivity, the electricity-carrying plate being attached to said inner column together with the guide member, the electricity-carrying plate having a pair of contact pieces elastically deformed and in contact with insides of said pair of guide walls at a predetermined contact pressure; and a metal fitting having conductivity, the metal fitting being in contact with the inner column and fixing the electricity-carrying plate together with the guide member to the inner column.

2. The steering apparatus according to claim 1, characterized in that said pair of contact pieces are arranged on a more front side with respect to a vehicle than said guide member.

3. The steering apparatus according to claim 1, characterized in that said pair of contact pieces are arranged on a more rear side with respect to said vehicle than said guide member.

4. The steering apparatus according to claim 1, characterized in that the pair of contact pieces are arranged on a front side with respect to a vehicle, and a further pair of contact pieces in contact with the inside of the pair of the guide walls are also arranged on a more rear side with respect to the vehicle than said guide member.

5. The steering apparatus according to claim 3, further comprising a protruding portion projecting from a part of said outer column on said rear side with respect to said vehicle, with regard to said guide groove into said guide groove to restrict movement of said guide member toward said rear side with respect to said vehicle while avoiding interference, with said pair of contact pieces.

6. The steering apparatus according to claim 1, characterized in that inner side surfaces of said pair of guide walls are surfaces finished to be smooth by grinding processing.

7. The steering apparatus according to claim 4, further comprising a protruding portion projecting from a part of said outer column on said rear side with respect to said vehicle, with regard to said guide groove into said guide groove to restrict movement of said guide member toward said rear side with respect to said vehicle while avoiding interference, with said pair of contact pieces.

* * * * *